United States Patent [19]
Knoop

[11] Patent Number: 5,967,596
[45] Date of Patent: Oct. 19, 1999

[54] PULL-APART MOTORHOME

[76] Inventor: Donald Elmer Knoop, 1209 Harvest, Longview, Tex. 75604

[21] Appl. No.: 08/909,148

[22] Filed: Aug. 11, 1997

[51] Int. Cl.⁶ .................................................. B60P 3/345
[52] U.S. Cl. .......................... 296/164; 296/166; 296/167
[58] Field of Search ................................... 296/164, 166, 296/167

[56] References Cited

U.S. PATENT DOCUMENTS

| | | | |
|---|---|---|---|
| 3,567,271 | 3/1971 | Gostomski | 296/164 |
| 4,247,145 | 1/1981 | Groene | 296/164 |
| 4,314,726 | 2/1982 | Artweger et al. | 296/164 |
| 4,354,707 | 10/1982 | Jones | 296/167 |
| 4,848,832 | 7/1989 | Starnes | 296/166 |

*Primary Examiner*—Gary C. Hoge

[57] ABSTRACT

A two part motorhome that is connected when on the road can be separated into a motorized chassis and a living unit at other times. The motorized chassis can be used as an independent vehicle. The living unit utilizes four corner mounted jacks which are extended for separating the unit from the chassis. The jacks are retracted to allow the living unit to be leveled and to be lowered to nearly ground level for easy access. Means are provided for locking the chassis and living unit together. The chassis ignition circuit fails to operate if the unit is not properly locked. A system employing two lasers is an alignment aid for the driver in properly reconnecting the chassis and the living unit.

4 Claims, 3 Drawing Sheets

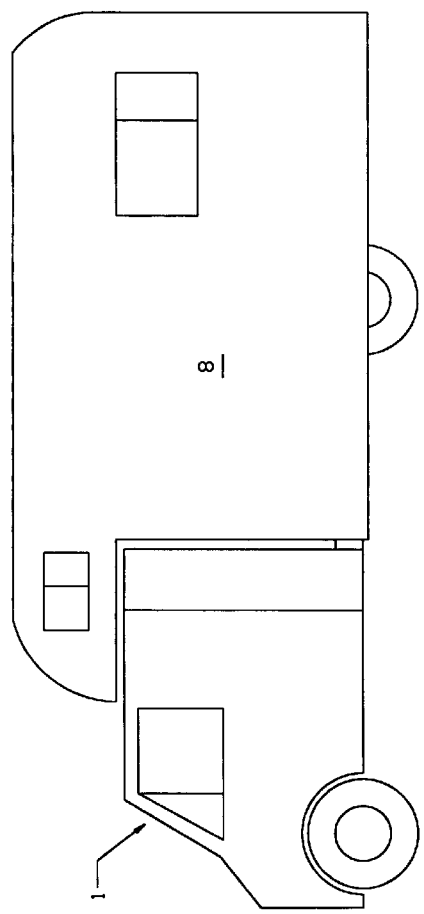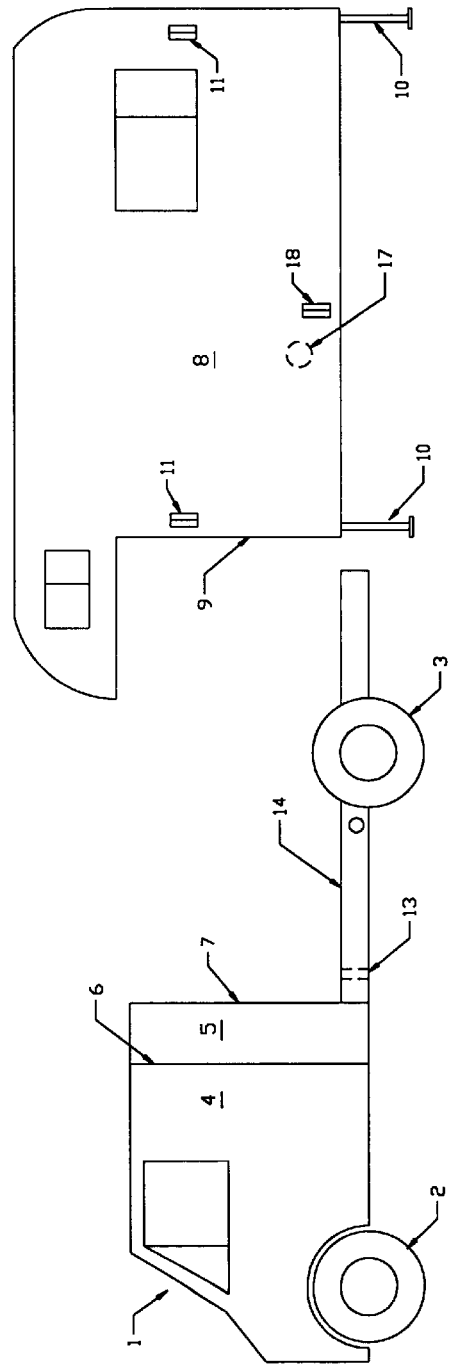

PULL-APART MOTORHOME

BACKGROUND OF THE INVENTION

Motorhomes may be manufactured directly on a special chassis or fitted on a stock or modified chassis, such as a pickup truck or a van. In the latter case, the living unit may be separable from the chassis for independent usage. Typical of such motorhomes are those disclosed in Miller, et al U.S. Pat. No. 3,719,244; Ward U.S. Pat. No. 3,817,545 and McPherson U.S. Pat. No. 4,322,108. These show living units which are on wheels and therefore cannot be lowered or leveled. According to this invention, a motorhome, such as one using a van chassis having a separable living unit, can be raised, lowered, and leveled. This invention includes a system to lock the two units together and an alignment aid for recoupling the units. Typical of such alignment aids are those described in Coleman U.S. Pat. No. 4,627,634 and Burrus U.S. Pat. No. 5,224,270 which are visual aids for alignment at a single point; i.e., the trailer hitch, rather than alignment along a center line which is needed for a pull-apart motorhome.

SUMMARY OF THE INVENTION

The present invention provides a two part motorhome that is connected when on the road and is separable at a campsite or elsewhere. The motorized first part, referred herein after as the chassis, can be disengaged from the second part, referred herein after as the living unit, to provide transportation without disturbing the living unit. The chassis can be a cutaway van, a pickup truck, a modified bus or similar vehicle. It preferably includes a flat bed with an enclosed driver/passenger compartment with a rear exit door. The living unit can be that used for a mini motorhome (Class C), a modified trailer (with the running gear removed) or a custom built unit.

The present invention provides a vehicle assembly combination comprising a chassis for travel and a separable unwheeled living unit. Registering doorways provide easy movement of passengers between the chassis and living unit. A mechanical interlocking means is provided for releasible securing the living unit to the chassis preferably using pins moved into place using powered lead screws. Electrical interlocking is provided to the ignition control of the chassis if the living unit is not properly mechanically locked. Jacks attached to each corner of the living unit provide support for the living unit during separation from the chassis and permit raising, lowering, and leveling of the living unit. A laser means is provided for aligning the chassis and the living unit during securing as an assembly.

BRIEF DESCRIPTION OF DRAWINGS

FIG. 1 illustrates a motorhome embodying the principles of the present invention FIG. 2 illustrates a motor home separated into a chassis and a living unit

DETAILED DESCRIPTION

Figure 3:
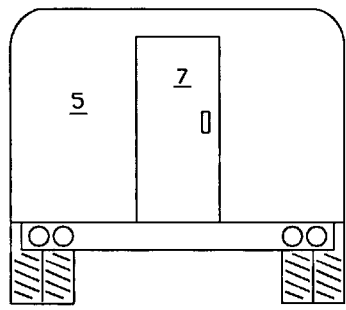
FIG. 3 is a rear view of the chassis showing the connecting door

The preferred embodiment of the invention is shown in FIG. 1 and FIG. 2, the latter in the separated state. A production cutaway model van 1, is used as a chassis having steerable front wheels 2, rear driving wheels 3, and an enclosed cab 4. The rear enclosure 5 of said cab is a custom built part as shown in FIG. 3. Said rear enclosure 5 is attached to the rear edge 6 of said cab 4. Said rear enclosure 5 is fitted with a sliding door 7 which closes said cab 4 when separated or alternately allows egress into the living unit 8 when connected.

Figure 4:
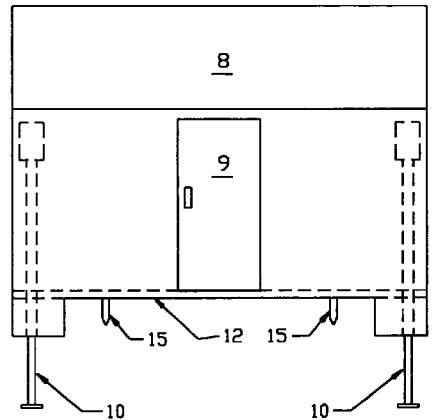
FIG. 4 is a front view of the living unit showing the connecting door and electric jacks

Said living unit 8 is preferably that of a production class C motorhome. Said living unit 8 is modified by enclosing the front of said unit 8 and adding a door 9 to provide access when coupled together as a motorhome and a second entrance/exit door when separated as shown in FIG. 4. Four electric motorized jacks 10 are preferably fitted into the corners of said living unit 8 in such a manner that said jacks 10 are inside the unit 8 and therefore hidden from view until said jacks 10 are extended from the underside of said unit 8. Said jacks 10 are operated from pairs of switches 11 located on the driver's side of said unit 8 as shown in FIG. 2.

Figure 5:
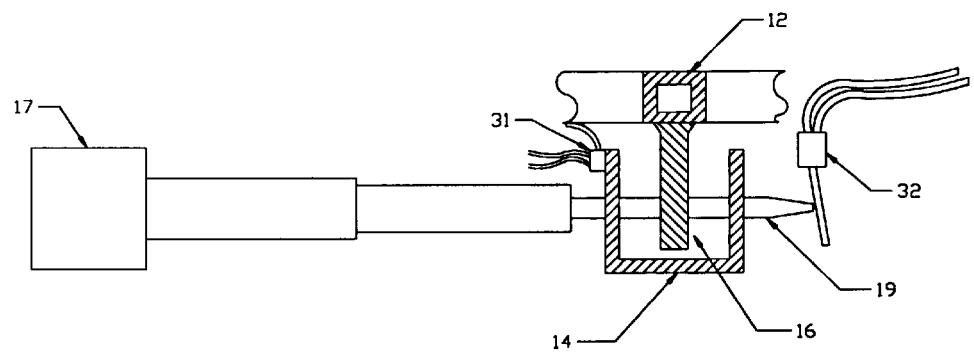
FIG. 5 is a diagram of the locking mechanism
Figure 6:
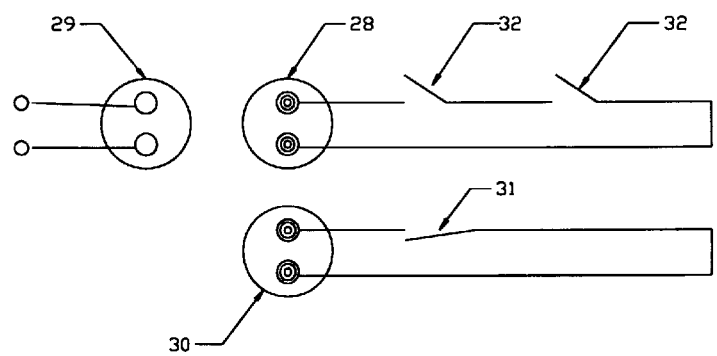
FIG. 6 is a circuit diagram for the interlock system

Said living unit 8 is secured to said chassis 1 by means of two vertical pins 15 attached on either side of the front member of the frame 12 of said unit 8 as shown in FIG. 4. Said pins 5 extend through circular receptacles 13 in the main members of the chassis frame 14. Additional locking of said unit 8 to said chassis frame 14 is provided by two pointed pins 19 as shown in FIG. 5. Each of said pins 19 extends through said chassis frame 14 and flange 16 attached to said unit frame 12. Said pin 19 is attached preferably to electric motorized lead screw 17 which is selectively extended or retracted by means of switch 18. Proper insertion of said pin 19 through said frames 14 and 16 causes safety switch 32 to complete an electrical path in the chassis ignition circuit. Incorrect insertion of said pin 19 inhibits vehicle ignition as a safety feature. FIG. 6 shows a preferred circuit diagram for the locking system. Electrical plug 28 is manually inserted into socket 29 when said living unit 8 and said chassis 1 are together as a motorhome. The normally open switches 32 are closed when said pins 19 are properly inserted thereby completing the ignition circuit. When separated, said plug 28 is removed from said socket 29 and plug 30 is inserted. Switch 31, which is normally closed, provides a completed circuit for the ignition. When said living unit 8 is again resting on said frame 14 of said chassis 1, said switch 31 is opened, preventing ignition until said plug 30 is removed from said socket 29 and said plug 28 is inserted with said pins 19 properly inserted to cause said switches 32 to be closed.

Figure 7:
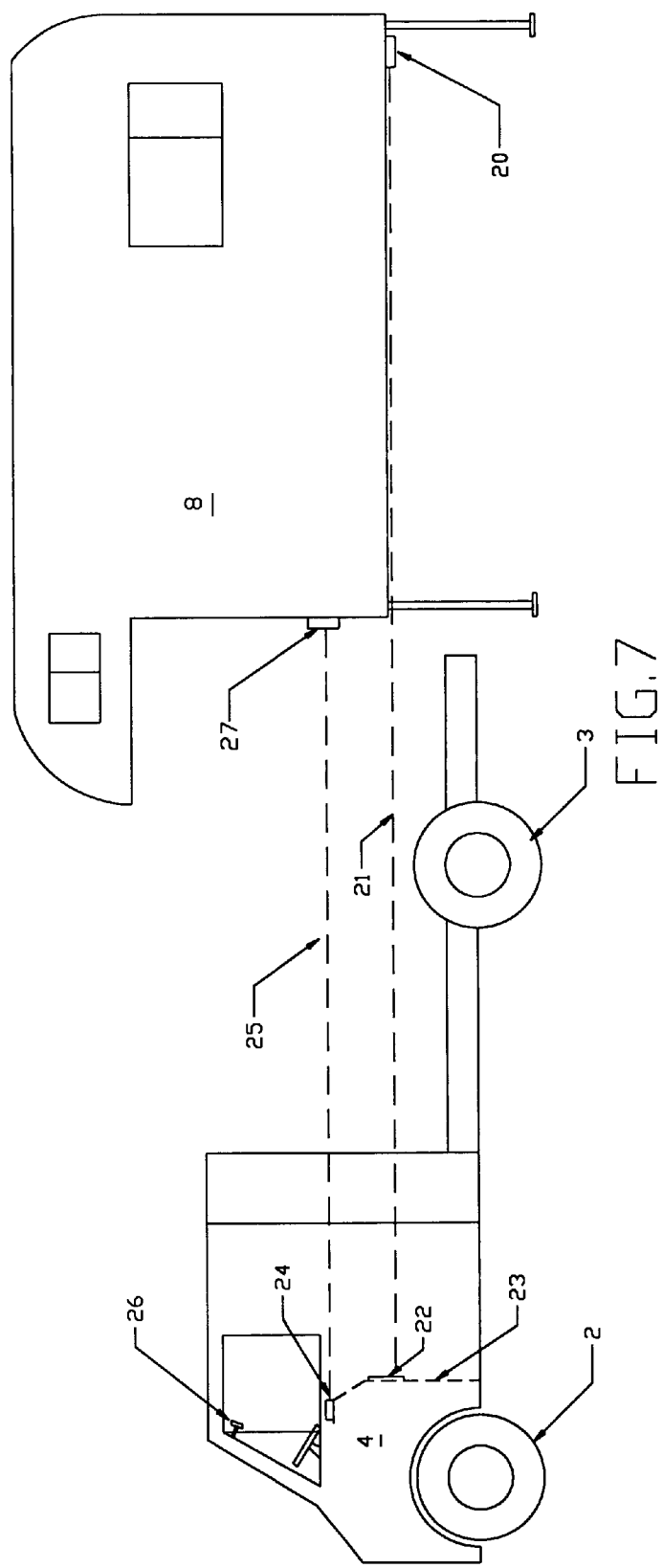
FIG. 7 is a diagram of the alignment aid

The driver is aided in reuniting said chassis 1 with said living unit 8 by a laser device 20, as shown in FIG. 7, which is attached to said unit 8 at its rear center and positioned such that the laser beam 21 passes a point below the front center of said unit 8. The driver positions said chassis 1 such that the laser beam passes through the doorway of said rear door 9 of said cab 4 and impinges on an opaque target 22 affixed to the rear of the engine cover 23. Said target 22 is positioned at the transverse center of said cab 4. A second laser device 24 is centered above said target 22. Said laser 24 is positioned such that its laser beam 25 passes above the center point between said wheels 3 and impinges on target 27. The driver steers said chassis front wheels 2 in order to visually align in the rear view mirror 25, the image of said laser beam 25 on center of said target 27 while simultaneously maintaining the laser beam 21 image on center of said target 22. This preferred embodiment utilizes driver vision of laser images, however, said targets 22 and 27 may be arrays of light sensitive devices which provide electrical signals to electronic digital logic that provides left or right steering indication to the driver.

I claim:

1. A vehicle assembly combination comprising a chassis for travel and a separable unwheeled living unit, said combination including:

door means for providing easy movement of the passengers between said living unit and said chassis during travel;

a frame on said chassis unit for supporting said living unit during travel;

mechanical interlocking means for releasible securing said living unit to said frame thereof; and jack means attached to said living unit for supporting said living unit during release and separation from said chassis and for permitting lowering and leveling of said living unit following separation and for permitting raising of said living unit prior to securing said living unit to said power unit on said frame thereof;

an electrical ignition control, means for electrically interlocking said ignition control of the power unit when said living unit is on said frame of said chassis but not properly mechanically locked thereto; and means for enabling said ignition control when said living unit is separated from said chassis.

2. The vehicle assembly combination according to claim 1 wherein said living unit is essentially rectangular having four corners and said jack means includes:

a plurality of individual jack mechanisms attached near to each corner of said living unit, said plurality being electrically operative means for electrically interlocking said ignition control of the power unit when said living unit is on said frame of said power unit.

3. The vehicle assembly combination according to claim 1 wherein said vehicle combination further includes:

laser means for visually aligning said chassis and said living unit to aid in the securing thereof.

4. The vehicle assembly combination according to claim 2 wherein said vehicle combination further include:

laser means for visually aligning said chassis and said living unit to aid in the securing thereof.

\* \* \* \* \*